Figure 1:
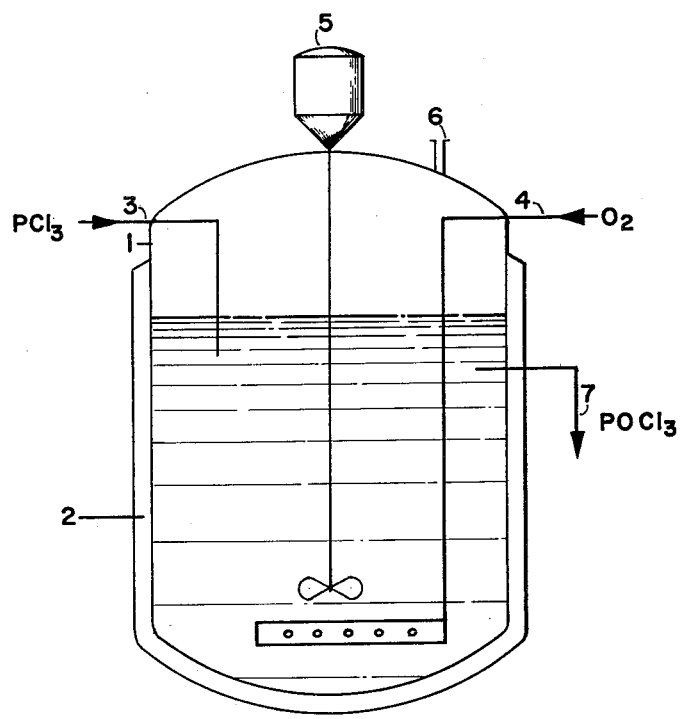

Sept. 4, 1962  A. G. DRAEGER ET AL  3,052,520
MANUFACTURE OF PHOSPHORUS OXYCHLORIDE
Filed Nov. 21, 1957  2 Sheets-Sheet 1

FIGURE — 1

D. S. BUNIN
A. G. DRAEGER
G. W. OLSEN
  INVENTORS

BY W. PRICE
  AGENT.

United States Patent Office 3,052,520
Patented Sept. 4, 1962

3,052,520
MANUFACTURE OF PHOSPHORUS
OXYCHLORIDE
Albertus G. Draeger, St. Albans, W. Va., Donald S. Bunin, Metuchen, N.J., and Glen W. Olsen, Charleston, W. Va., assignors to FMC Corporation, a corporation of Delaware
Filed Nov. 21, 1957, Ser. No. 697,833
8 Claims. (Cl. 23—203)

This invention relates to the manufacture of phosphorus oxychloride from phosphorus trichloride. More particularly, this invention relates to the manufacture of phosphorus oxychloride by the reaction of phosphorus trichloride and oxygen-containing gases such as air or oxygen-enriched air; and also to apparatus particularly adapted for carrying out the process.

Phosphorus oxychloride ($POCl_3$) is a common industrial chemical widely used as an intermediate in the preparation of plasticizers, motor-fuel additives such as tricresyl phosphate produced by the reaction of cresylic acid and $POCl_3$, insecticides, extraction solvents such as tributyl phosphate etc.

Phosphorus oxychloride has been made in the past by a number of processes, two of which may be represented by the following equations:

(1) $3PCl_3 + 3Cl_2 + P_2O_5 \rightarrow 5POCl_3$ (2) $P_2O_5 + 3COCl_2 \rightarrow 2POCl_3 + 3CO_2$ Both of the processes illustrated by the above equations are batch operations and are not entirely satisfactory for one reason or another.

Numerous attempts to produce phosphorus oxychloride by direct oxidation of phosphorus trichloride with oxygen either in the liquid phase or in the vapor phase, with or without the use of a catalyst such as magnesium oxide, have been reported in the literature. The proposed direct oxidation has the following equation:

$$2PCl_3 + O_2 \rightarrow 2POCl_3$$

One of the more recent reports in connection with a proposed direct oxidation is described in BIOS Final Report No. 562, The German Phosphorus Industry at Bitterfield and Piesteritz. According to this report phosphorus oxychloride was obtained by batch scale oxidation of phosphorus trichloride with oxygen in 60–80 hours at a temperature of 50–60° C.

The prior art direct oxidation processes have suffered from a number of disadvantages among which are the relatively long time required for preparation of a single batch, the need to vary the rate of oxygen addition to the reactor in accordance with the degree of conversion obtained, and the dangers of fire and explosion inherent in the contacting of phosphorus trichloride with oxygen in the absence of any diluent or moderator.

Foremost among these disadvantages is the danger of fire and explosion. Ordinarily phosphorus trichloride in the presence of air is not inflammable. However, when as in the case of the prior art processes, phosphorus trichloride is mixed with oxygen or oxygen enriched air, a substantial danger of explosion exists. This is due primarily to the fact that at the beginning of the batch operation, the atmosphere is composed entirely of vaporous phosphorus trichloride, and oxygen and vaporous phosphorus trichloride is very inflammable under these conditions. For example, it has been determined that at the beginning of a batch operation in which pure oxygen is used at atmospheric pressure, the components in the vapor phase constitute a flammable mixture subject to explosion by a point of localized overheating or by a spark, at any temperature over 27° C. At temperatures below 27° C. a lower temperature coolant other than normally available river water would have to be utilized to remove the heat of reaction and this would necessarily entail considerable capital expenditures.

It is an object of this invention to provide a process for the continuous preparation of phosphorus oxychloride by direct oxidation of phosphorus trichloride, which process is simple to carry out, is largely free of fire and explosion hazards, does not require cyclical changes of operating conditions, and which may be performed in relatively simple equipment with only minor operator supervision. A further object of this invention is to provide a process of preparing phosphorus oxychloride by direct oxidation of phosphorus trichloride in which the whole operation may be carried out continuously for an indefinite period without the need of changing operating conditions. A further object of this invention is to provide apparatus particularly adapted for carrying out the continuous process. Other objects of the invention will become readily apparent from the following description.

In accordance with this invention there is provided a process for preparing phosphorus oxychloride by continuous liquid phase oxidation of phosphorus trichloride in a heel composed of phosphorus oxychloride and unreacted phorphorus trichloride.

The use of a heel of phosphorus oxychloride overcomes the danger of fire hazard and explosion since the main constituent in the liquid phase is the non-flammable phosphorus oxychloride. The composition of the vapor phase is a function of the liquid composition and operating temperature at a given operating pressure. To remain out of the explosive region, a liquid composition and operating temperature must be selected which allows the reaction to proceed safely, at a satisfactory reaction rate and allows for adequate heat transfer.

The concentration of the heel of phosphorus oxychloride, at operating conditions, should be such as to eliminate the risk of fire and explosion and satisfy the other conditions. For example, if it is desired to operate at atmospheric pressure and at about 43° C., the liquid composition of phosphorus oxychloride and phosphorus trichloride must comprise at least 53 weight percent of phosphorus oxychloride. At this temperature and pressure and with a heel comprising at least 53 weight percent phosphorus oxychloride, the vapor phase composition is such that the amount of phosphorus trichloride present is outside the explosive range. Similarly, if it is desired to operate at atmospheric pressures and at temperatures of about 58° C. or 70° C. the liquid composition must comprise at least 72 or 82 weight percent phosphorus oxychloride respectively. Alternatively, if it is desired to operate the reaction at a superatmospheric pressure of about 30 p.s.i.g., the liquid composition must comprise at least 53 weight percent, 72 weight percent or 82 weight percent phosphorus oxychloride respectively if the temperature is to be maintained at 77° C., 93° C. or 108° C. respectively.

Heel concentrations as high as 99 weight percent phosphorus oxychloride can be utilized but a value of 80–90 weight percent is preferred. The process may be operated at temperatures in the range of 15 to 70° C. at atmospheric pressure or at higher temperatures at superatmospheric pressure. It has been found, however, that at atmospheric pressure and at temperatures above 70° C. the solubility of the oxygen is decreased and consequently slows the reaction rate. It is preferred to operate the process at temperatures between 20 and 60° C. and at pressures between atmospheric and 30 p.s.i.g.

The reaction may be carried out in a kettle reactor which is provided with a suitable heat exchanger. Phosphorus trichloride and oxygen, or an oxygen-containing gas such as air or oxygen-enriched air are introduced separately at different points into the reactor. The phosphorus trichloride may be introduced, e.g., into the top of the reactor and discharged beneath the top of the heel of phosphorus oxychloride. The oxygen or oxygen-containing gas may be introduced into the bottom of the heel and preferably sparged into the heel in the form of small bubbles. The reactants are thoroughly mixed by agitating the solution as e.g. by means of a stirrer. The rates of introduction of the phosphorus trichloride and oxygen or oxygen-containing gas are preferably regulated so that essentially all of the phosphorus trichloride and oxygen react within the time required. The phosphorus oxychloride produced is continuously drawn off from the top of the heel and in fact becomes part of the heel. As previously indicated, the phosphorus oxychloride that is drawn off comprises preferably about 80–90% by weight with the remainder comprising unreacted phosphorus trichloride. This product may be purified further if required by rectification.

One form of apparatus suitable for carrying out the invention is shown in FIGURE 1 and reference should be had to this figure in connection with the following description.

Reactor 1 is surrounded by heat exchanger 2, which may be external as pictured in FIGURE 1 or may be internal in the form of coils. Since trace amounts of copper and iron tend to inhibit the oxidation of $PCl_3$ to $POCl_3$, it is best to employ $PCl_3$ free of these metals and to fabricate the equipment of materials which do not corrode under conditions of use to result in such contamination; glass, porcelain, lead-lined steel, and the nickel alloy known as Hastelloy B and sold by the Haynes-Stellite Division of Union Carbide Co. are satisfactory materials of construction. The reactor contains a mixture, e.g. of about 80 weight percent phosphorus oxychloride and 20 weight percent phosphorus trichloride.

Phosphorus trichloride is continuously introduced into mixture, beneath the surface of the mixture from line 3. Oxygen is continuously introduced into the bottom of the mixture through line 4. Agitator 5, rotating at a constant speed, provides for substantially uniform mixing of the reactants.

Unreacted oxygen and inert gases are disengaged from the reactor through vent 6. Phosphorus oxychloride product is continuously withdrawn through line 7. The product contains about 80% phosphorus oxychloride and the remainder is unreacted phosphorus trichloride. The product mixture may be sent to a rectifying unit (not shown) if further purification is desired.

In the apparatus described above, it is obvious that the production capacity, and therefore the optimum flow rates will depend on a large number of factors such as size of the reactor, $PCl_3:POCl_3$ ratio in the reactor, oxygen content of feed gas, temperature etc. Most of these factors may be varied within wide limits, and those skilled in the art will be able to select suitable conditions.

Figure 2:
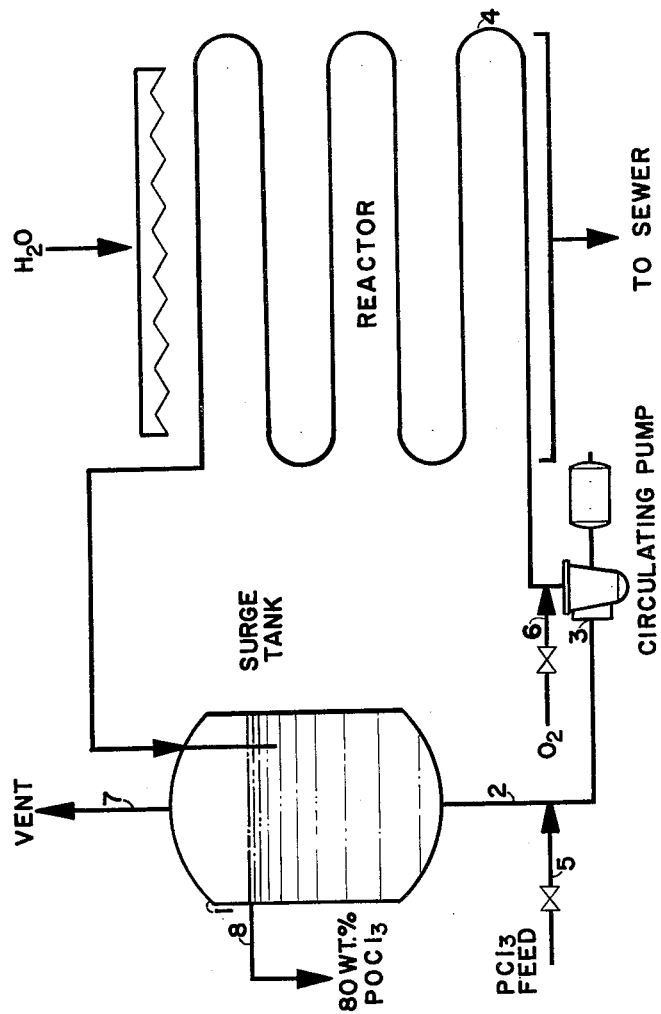

One type of apparatus particularly adapted for carrying out the process of this invention is set forth in FIGURE 2 and reference should be had thereto in connection with the following description.

The apparatus shown in FIGURE 2 may be termed a pipe line reactor and is an excellent device for carrying out the phosphorus trichloride oxidation continuously and has several advantages over conventional kettle-type reactors. The reaction between the phosphorus trichloride and oxygen or oxygen-containing gas is highly exothermic and sufficient heat removal capacity must be provided to control reaction temperature below 70° C., preferably below 60° C. The pipe line reactor not only serves as a reaction chamber but can also be made to serve as a heat exchanger in small and medium size units simply by providing a means of cooling on the outside of the pipe. In larger units, a conventional heat exchanger enveloping the pipe reactor may be used.

In the reaction a high degree of gas-liquid mixing must be obtained to get good oxygen utilization and high reaction rate. The excellent contact which is obtained in the pipe line reactor is evidenced by the high productivity and good oxygen utilization which may be 99% or better. The pipe line reactor also has the distinct advantage of minimizing the amount of available vapor space and consequently decreases the possibility of fire or explosion.

In accordance with this modification of the invention, a body of phosphorus oxychloride containing from 1 to 30% of phosphorus trichloride is circulated, preferably under conditions of turbulent flow, from a surge tank, through the pipe reactor and back to the surge tank, the recirculation rate and heat exchanger surface and volume being selected so that the temperature of the circulating liquid is preferably maintained below 60° C. Phosphorus trichloride and oxygen, or oxygen-enriched air, are introduced separately at different points into the circulating liquid. The rates of introduction of the reactants are regulated so that essentially all the phosphorus trichloride and all the oxygen introduced react within the time required for the circulating reaction mass to return to the surge tank. It is preferred to introduce the oxygen on the discharge side of the recirculation pump. The reactor is cooled by water flowing on the external surfaces of the pipe.

Surge tank 1 contains a mixture of phosphorus trichloride and phosphorus oxychloride containing about 80% of the latter. The mixture is withdrawn through a bottom draw-off line 2 by a circulating pump 3 and caused to flow through a reactor coil 4 back to surge tank 1. In a large reactor coil, the coil will be jacketed and water will flow through the jacket to remove the heat of reaction. In the unit shown, the coils are cooled by allowing water to flow over the sides thereof.

Phosphorus trichloride is introduced into the circulating stream through inlet 5, and oxygen is introduced into the circulating $PCl_3$—$POCl_3$ mixture through oxygen inlet 6 under pressure. Unreacted oxygen and inert gases are removed from the surge tank through vent line 7. Reaction product is withdrawn from surge tank 1 through product off-take line 8. The product contains 80% by weight phosphorus oxychloride and 20% by weight phosphorus trichloride. The phosphorus oxychloride may be purified by rectification or by further reaction. Rectification may be dispensed with if admixture of a small amount of $PCl_3$ with the product $POCl_3$ is unobjectable.

As indicated previously, trace amounts of copper and iron inhibit the oxidation of $PCl_3$ to $POCl_3$ and the reactants and materials of construction should be free of these contaminants.

While the foregoing description shows a process in which the contents of the surge tank are maintained at 80% $POCl_3$ composition it is possible to operate with a higher or lower $POCl_3$ content.

The optimum flow rates will depend on a large number of interrelated factors such as rate of recirculation, length, diameter and particular configuration of the reactor coils, $PCl_3:POCl_3$ ratio in the surge tank, oxygen content of the feed gas, temperature etc. Most of these factors may be varied within rather wide limits, and a person skilled in the art will be able to select suitable conditions. The reaction can be carried out at atmospheric or superatmospheric pressure, with a pressure gradient of 20–30 p.s.i. across the reactor as the preferred condition. The ratio of liquid to gas at the oxygen inlet may be as low as 2/1 but we prefer to operate at a ratio of 4.2/1. The retention time in the reactor may be as little as 0.05 minute but the preferred retention time is 0.5 minute.

Another modification of our invention is the discovery that a minimum superficial liquid velocity must be maintained in the initial zone of the reactor. It has been found that the oxygen which is introduced at the oxygen inlet tends to "slug flow" if a minimum initial liquid velocity is not maintained. Slug flow is a condition in which the oxygen gas forms large pockets on the top of the liquid rather than dispersing therein. It is obvious that such a condition would increase the risk of fire hazard rather than obviate it, as is the object of this invention, if such a condition is allowed to exist. In order to achieve the desired "bubble flow," that is dispersion of the oxygen gas in the liquid medium, it is necessary to maintain a minimum liquid velocity in the initial zone of the reactor of between about 8 to 11 feet per second, preferably about 10 ft./sec. It is not necessary to maintain this rate of flow throughout the entire reactor, but rather we have found that the initial zone of reaction in which this rate of flow is necessary may be limited to 5–8 percent of the total reaction volume, preferably 6 percent of the total reaction volume. This desired rate of flow may be achieved by making the diameter of the initial section of the reactor smaller than the remainder of the pipe reactor. The minimum superficial liquid velocity in the remainder of the reactor may be as low as 0.25 ft./sec. but we prefer to maintain it at about 4–6 ft./sec., preferably about 5 ft./sec.

The invention may be illustrated by reference to the following example which is intended for illustrative purposes only.

A pipe line reactor with two 10-ft. passes of 1½″ diameter and 14 10-ft. passes of 2″ diameter having a ¼″ bonded lead lining on each segment of the reactor was used. A glass-lined surge tank having a 50 gallon capacity was employed and a centrifugal pump was employed for recircling the liquid feed from the surge tank to the pipe reactor and from the pipe reactor to the surge tank. Commercial phosphorus trichloride and cylinder oxygen feeds were used. Product heel concentration was maintained at 79 weight percent phosphorus oxychloride. The conditions and results of the run can be summarized as follows:

The run was completed in four hours during which time 300 lbs. of phosphorus trichloride was fed through the pipe reactor and 24.6 lbs. oxygen were fed to the pipe reactor. The feed rate throughout the reaction was 75 lbs. per hour of phosphorus trichloride and 6.4 lbs. per hour of oxygen. 256 lbs. of product were obtained which comprised 79.0% of phosphorus oxychloride. The oxygen utilization was 99% and the reaction temperature was maintained between 25 and 30° C. during the course of the reaction. A pressure of 23 p.s.i.g. was maintained at the oxygen inlet and a pressure of 2 p.s.i.g. was maintained at the reactor outlet.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. In the process for the production of phosphorus oxychloride by the liquid phase reaction of phosphorus trichloride with oxygen, the method of preventing the formation of explosive mixtures in the vapor phase above said liquid phase which comprises conducting the reaction throughout its course in a liquid medium containing phosphorus oxychloride and phosphorus trichloride, maintaining at all times during the reaction a concentration of phosphorus oxychloride in said liquid medium which is greater than the concentration of phosphorus trichloride, and maintaining the temperature in the range between 15° C. and the maximum temperature at which the vapors above said liquid medium are not in the explosive region for the concentration of phosphorus trichloride in said liquid medium, said maximum temperature varying at atmospheric pressure from 43° C., when the phosphorus oxychloride concentration is just greater than the phosphorus trichloride concentration, to 70° C., when the concentration of phosphorus oxychloride is 82 percent by weight, and at 30 p.s.i.g. from 77° C., when the phosphorus oxychloride concentration is just greater than the phosphorus trichloride concentration, to 108° C., when the concentration of phosphorus oxychloride is 82 percent by weight.

2. The method of claim 1 in which the concentration of phosphorus oxychloride in said liquid medium is maintained in the range of 80 to 90 percent by weight and the temperature is maintained in the range of 20° to 60° C., at atmospheric pressure.

3. In the process for the production of phosphorus oxychloride by the liquid phase reaction of phosphorus trichloride with oxygen-enriched air, the method of preventing the formation of explosive mixtures in the vapor phase above said liquid phase which comprises conducting the reaction throughout its course in a liquid medium containing phosphorus oxychloride and phosphorus trichloride, maintaining at all times during the reaction a concentration of phosphorus oxychloride in said liquid medium which is greater than the concentration of phosphorus trichloride, and maintaining the temperature in the range between 15° C. and the maximum temperature at which the vapors above said liquid medium are not in the explosive region for the concentration of phosphorus trichloride in said liquid medium, said maximum temperature varying at atmospheric pressure from 43° C., when the phosphorus oxychloride concentration is just greater than the phosphorus trichloride concentration, to 70° C., when the concentration of phosphorus oxychloride is 82 percent by weight, and at 30 p.s.i.g. from 77° C., when the phosphorus oxychloride concentration is just greater than the phosphorus trichloride concentration, to 108° C., when the concentration of phosphorus oxychloride is 82 percent by weight.

4. The method of claim 3, in which the concentration of phosphorus oxychloride in said liquid medium is maintained in the range of 80 to 90 percent by weight and the temperature is maintained in the range of 20° to 60° C., at atmospheric pressure.

5. A continuous process for the production of phosphorus oxychloride by the liquid phase reaction of phosphorus trichloride with oxygen which comprises continuously introducing phosphorus trichloride and oxygen into a reactor and below the surface of a liquid medium containing phosphorus oxychloride and phosphorus trichloride, continuously maintaining the concentration of phosphorus oxychloride in said liquid medium in the range of 80 to 90 percent by weight, while maintaining the temperature in the range of 20° to 60° C., and continuously withdrawing a portion of said liquid medium as a product of the process.

6. A continuous process for the production of phosphorus oxychloride by the liquid phase reaction of phosphorus trichloride with oxygen-enriched air which comprises continuously introducing phosphorus trichloride and oxygen-enriched air into a reactor and below the surface of a liquid medium containing phosphorus oxychloride and phosphorus trichloride, continuously maintaining the concentration of phosphorus oxychloride in said liquid medium in the range of 80 to 90 percent by weight, while maintaining the temperature in the range of 20° to 60° C., and continuously withdrawing a portion of said liquid medium as a product of the process.

7. A continuous process for the production of phosphorus oxychloride by the liquid phase reaction of phosphorus trichloride with oxygen which comprises continuously introducing phosphorus trichloride and oxygen into a liquid body of phosphorus oxychloride circulating through a pipeline reactor, continuously maintaining the concentration of phosphorus oxychloride in said circulating liquid body in the range of 70 to 99 percent by weight, while maintaining the temperature in the range of 20° to 60° C., and continuously withdrawing a portion of said circulating liquid body as a product of the process.

8. A continuous process for the production of phosphorus oxychloride by the liquid phase reaction of phosphorus trichloride with oxygen-enriched air which comprises continuously introducing phosphorus trichloride and oxygen-enriched air into a liquid body of phosphorus oxychloride circulating through a pipeline reactor, continuously maintaining the concentration of phosphorus oxychloride in said circulating liquid body in the range of 70 to 99 percent by weight, while maintaining the temperature in the range of 20° to 60° C., and continuously withdrawing a portion of said circulating liquid body as a product of the process.

References Cited in the file of this patent

UNITED STATES PATENTS

| 1,888,713 | Britton et al. | Nov. 22, 1932 |
| 2,575,316 | Jonas et al. | Nov. 13, 1951 |
| 2,802,717 | Edwards et al. | Aug. 13, 1957 |

OTHER REFERENCES

"The German Phophorus Industry at Bitterfield and Piesteritz," PB 34740, July 1946, page 36.

Thorp's Dictionary of Applied Chemistry, 4th Edition, vol. IX, 1949, page 520.

Encyclopedia of Chemical Technology, vol. X, page 478, 1953.